(12) United States Patent
Wang et al.

(10) Patent No.: US 11,340,659 B2
(45) Date of Patent: May 24, 2022

(54) ELECTRONIC DEVICE

(71) Applicant: Acer Incorporated, New Taipei (TW)

(72) Inventors: Yu-Shih Wang, New Taipei (TW);
Wen-Chieh Tai, New Taipei (TW);
Cheng-Nan Ling, New Taipei (TW);
Chih-Chun Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 106 days.

(21) Appl. No.: 16/992,135

(22) Filed: Aug. 13, 2020

(65) Prior Publication Data

US 2021/0208635 A1  Jul. 8, 2021

(30) Foreign Application Priority Data

Jan. 7, 2020  (TW) ................. 109200225

(51) Int. Cl.
*G06F 1/16* (2006.01)
*G06F 3/0354* (2013.01)
*H02J 7/00* (2006.01)

(52) U.S. Cl.
CPC .......... *G06F 1/1656* (2013.01); *G06F 1/1643* (2013.01); *G06F 3/03545* (2013.01); *H02J 7/0044* (2013.01)

(58) Field of Classification Search
CPC ................. G06F 1/1643; G06F 1/1656; G06F 2200/1632
See application file for complete search history.

(56) References Cited

U.S. PATENT DOCUMENTS 10,031,557 B1 *  7/2018  Morrison ................ G06F 1/266
2020/0319719 A1 * 10/2020  Files ........................ G06F 1/26

* cited by examiner

*Primary Examiner* — Anthony Q Edwards
(74) *Attorney, Agent, or Firm* — JCIPRNET

(57) ABSTRACT

An electronic device includes a casing, a stylus, a first magnet, a magnetic ring, and a pair of second magnets. The casing has a surface and an accommodation groove recessed from the surface. The stylus has a front end and a rear end. The first magnet is disposed at one of the front end and the rear end of the stylus, and the magnetic ring is disposed at the other of the front end and the rear end of the stylus. The second magnets are disposed in the casing and located below the accommodation groove, where locations of the first magnet and the magnetic ring correspond to locations of the second magnets.

8 Claims, 7 Drawing Sheets

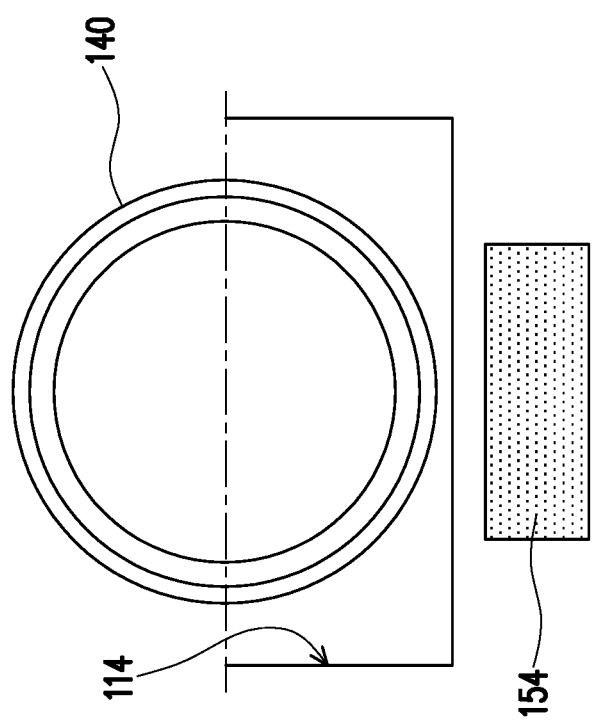

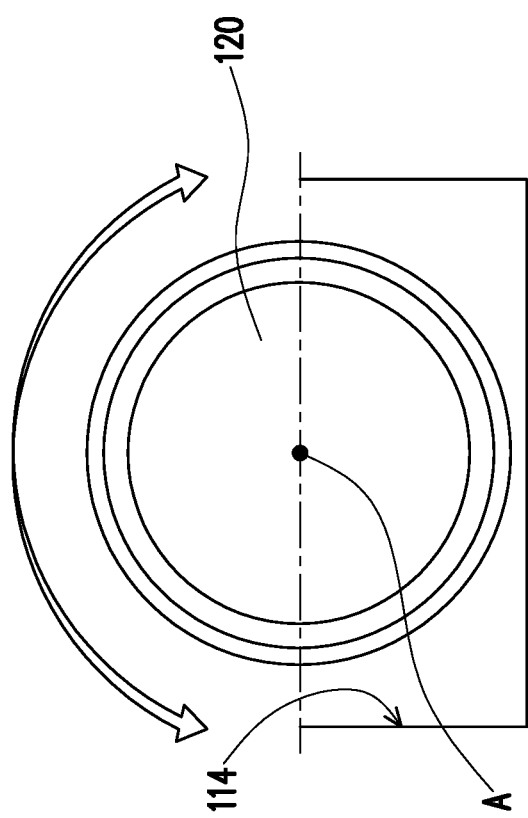

ELECTRONIC DEVICE

CROSS-REFERENCE TO RELATED APPLICATION

This application claims the priority benefit of Taiwan patent application serial no. 109200225, filed on Jan. 7, 2020. The entirety of the above-mentioned patent application is hereby incorporated by reference here and made a part of this specification.

BACKGROUND

Technical Field

The disclosure relates to an electronic device, and more particularly, to an electronic device that may be easily picked up from an accommodation groove.

Description of Related Art

With the development of science and technology, a touch screen has been widely used in an existing notebook computer, and a stylus may assist a user in accurately writing, making notes, or drawing on the touch screen, and therefore the stylus is an indispensable auxiliary tool for the touch screen.

The portability of the notebook computer allows the user to frequently bring the notebook computer with him or her. To prevent the stylus from being lost, the notebook computer is often designed to be equipped with an accommodation groove for accommodating the stylus, and the stylus is stored in the accommodation groove.

Generally, in order to facilitate the user to pick up the stylus from the accommodation groove, the accommodation groove is extended to be longer than the stylus, and a finger accommodation groove is formed at a place corresponding to a rear end of the stylus, so that the user may easily put his or her finger into the finger accommodation groove to dig up the stylus.

SUMMARY

The disclosure provides an electronic device which allows a user to easily pick up a stylus from an accommodation groove.

According to an embodiment of the disclosure, an electronic device including a casing, a stylus, a first magnet, a magnetic ring, and a pair of second magnets is provided. The casing has a surface and an accommodation groove recessed from the surface. The stylus has a front end and a rear end, the first magnet is disposed at one of the front end and the rear end, and the magnetic ring is disposed at the other of the front end and the rear end of the stylus. The second magnets are disposed in the casing and located below the accommodation portion, wherein locations of the first magnetic and the magnetic ring correspond to locations of the second magnets.

In an embodiment of the disclosure, the first magnet has a first magnetic pole and a second magnetic pole along a radial direction of the stylus, the first magnetic pole is close to a circumferential surface of the stylus, and the second magnetic pole is close to a center of axis of the stylus. Each of the pair of second magnets has a third magnetic pole and a fourth magnetic pole. The magnetic poles of the pair of second magnets are placed in the same manner or in different manners.

In an embodiment of the disclosure, the third magnetic poles of the pair of second magnets whose locations correspond to the first magnet are relatively close to the accommodation groove, the fourth magnetic poles of the pair of second magnets whose locations correspond to the first magnet are relatively far away from the accommodation groove, and the first magnetic pole and the third magnetic poles are magnetically repulsive.

In an embodiment of the disclosure, the pair of second magnets is spaced from each other.

In an embodiment of the disclosure, the electronic device further includes a charging module disposed in the casing, and the charging module has a pair of charging elastic sheets located in and exposed by the accommodation groove. The electronic device further includes a pair of charging rings disposed at the stylus, and when the stylus is stored in the accommodation groove, the pair of charging rings contacts the pair of charging elastic sheets to charge the stylus.

Based on the above, in the electronic device provided in one or more embodiments of this disclosure, through the arrangement of the first magnet and the second magnet, the user is able to rotate the stylus, so that the first magnet and the second magnet are magnetically repulsive. Therefore, the user may easily pick up the stylus from the accommodation groove.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

FIG. 3B is a schematic view taken along a sectional line B-B depicted in FIG. 2.

FIG. 4 is a schematic view of rotating a stylus placed in an accommodation groove according to an embodiment of the disclosure.

DESCRIPTION OF THE EMBODIMENTS

Figure 1:
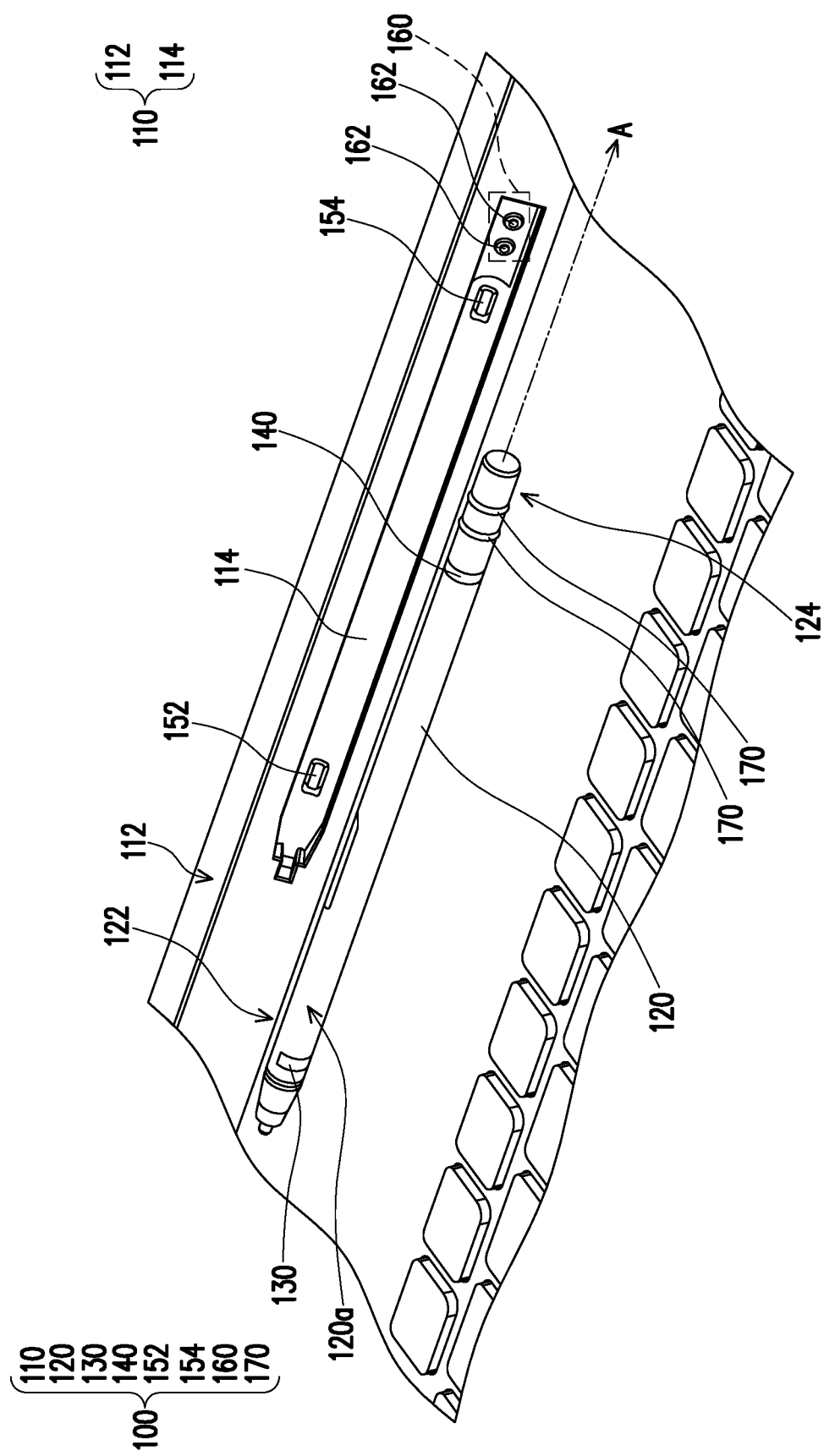
FIG. 1 is a schematic partial view of an electronic device according to an embodiment of the disclosure.
Figure 2:
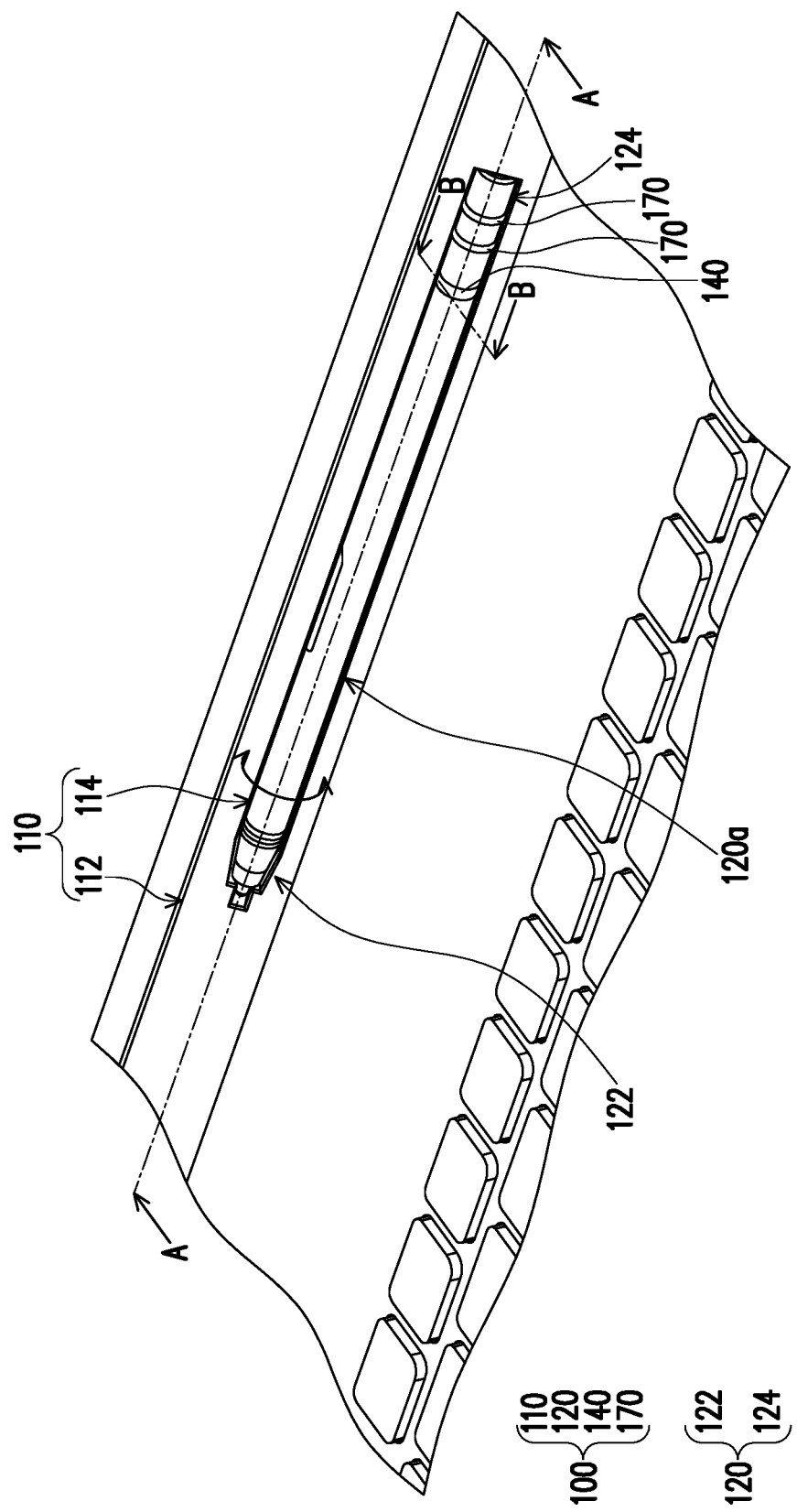
FIG. 2 is a schematic view illustrating that the stylus depicted in FIG. 1 is placed in an accommodation groove.
Figure 3A:
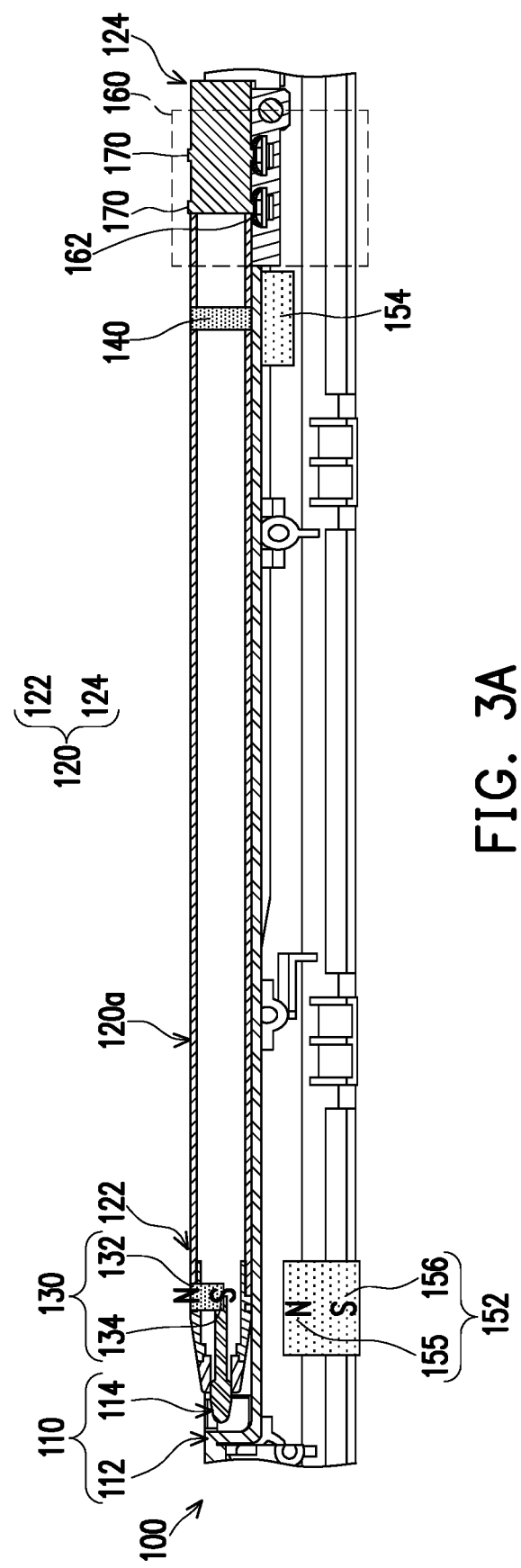
FIG. 3A is a cross-sectional view taken along a sectional line A-A depicted in FIG. 2.

FIG. 1 is a schematic partial view of an electronic device according to an embodiment of the disclosure. FIG. 2 is a schematic view illustrating that the stylus depicted in FIG. 1 is placed in an accommodation groove. FIG. 3A is a cross-sectional view taken along a sectional line A-A depicted in FIG. 2. With reference to FIG. 1, FIG. 2, and FIG. 3A at the same time, an electronic device 100 provided in an embodiment of the disclosure is a notebook computer that includes a casing 110, a stylus 120, a first magnet 130, a magnetic ring 140, and a pair of second magnets 152 and 154.

A material of the casing 110 may be plastic, and the casing 110 has a surface 112 and an accommodation groove 114 recessed from the surface 112.

The stylus 120 has a front end 122 (i.e., a tip of a pen) and a rear end 124 (i.e., a bottom of a pen). In this embodiment, the first magnet 130 is disposed at the front end 122 of the stylus 120, and the magnetic ring 140 is disposed at the rear end 124 of the stylus 120, which should however not be construed as limitations in the disclosure. Locations where the first magnet 130 and the magnetic ring 140 may be changed or exchanged according to actual requirements.

The second magnets 152 and 154 are disposed in the casing 110 and located below the accommodation groove 114. The locations of the first magnet 130 and the magnetic ring 140 correspond to locations of the second magnets 152 and 154.

In this embodiment, the first magnet 130 has a first magnetic pole 132 and a second magnetic pole 134 along a radial direction A of the stylus 120, the first magnetic pole 132 is close to or exposed by a circumferential surface 120a of the stylus 120, and the second magnetic pole 134 is close to a center of axis (not marked in the drawings) of the stylus 120. As shown in FIG. 3A, the first magnetic pole 132 is an N-pole, and the second magnetic pole 134 is an S-pole.

The two second magnets 152 and 154 are spaced from each other by a distance, and each of the second magnets 152 and 154 has a third magnetic pole 155 and a fourth magnetic pole 156. The magnetic poles of the two second magnets 152 and 154 may be placed in the same manner or in different manners. Specifically, the third magnetic poles 155 of the two second magnets 152 and 154 are N-poles, and the fourth magnetic poles 156 are S-poles; as exemplarily shown in FIG. 3A, the third magnetic poles 155 of the two second magnets 152 and 154 may be arranged relatively close to the accommodation groove 114, and the fourth magnetic poles 156 of the two second magnets 152 and 154 may be arranged relatively far away from the accommodation groove 114.

In other embodiments, it is also likely to arrange the third magnetic pole 155 of one of the two second magnets 152 and 154 to be relatively close to the accommodation groove 114 and the fourth magnetic pole 156 of the one of the two second magnets 152 and 154 to be relatively away from the accommodation groove 114, and the fourth magnetic pole 156 of the other of the two second magnets 152 and 154 may be arranged to be relatively close to the accommodation groove 114 and the third magnetic pole 155 of the other of the two second magnets 152 and 154 may be arranged to be relatively away from the accommodation groove 114. In other words, the two second magnets 152 and 154 are spaced from each other with opposite magnetic poles.

In this embodiment, the location of the second magnet 152 corresponding to the first magnet 130 is placed in such a manner that the third magnetic pole 155 of the second magnet 152 is relatively close to the accommodation groove 114, and that the fourth magnetic pole 156 of the second magnet 152 is relatively far from the accommodation groove 114.

FIG. 3B is a schematic view taken along a sectional line B-B depicted in FIG. 2. With reference to FIG. 3A and FIG. 3B at the same time, since the second magnet 154 whose location corresponds to the magnetic ring 140 serves to provide a magnetic attraction force to attract the magnetic ring 140 and thereby secure the stylus 120, the way to arrange the magnetic poles of the second magnet 154 whose location corresponds to the magnetic ring 140 is not particularly limited.

In addition, the electronic device 100 may further include a charging module 160, and the charging module 160 is disposed in the casing 110. The charging module 160 has a pair of charging elastic sheets 162 located in and exposed by the accommodation groove 114. Correspondingly, a pair of charging rings 170 may be disposed on the stylus 120, so that when the stylus 120 is stored in the accommodation groove 114, the stylus 120 may be charged through the contact between the charging rings 170 and the charging elastic sheets 162 of the charging module 160.

As shown in FIG. 1 and FIG. 2, where the stylus 120 is being used used, the stylus 120 may be placed into the accommodation groove 114. At this time, the second magnet 154 provides a magnetic attraction force to attract the magnetic ring 140, and thus the stylus 120 may be secured in the accommodation groove 114.

At the same time, the charging rings 170 contact the charging elastic sheets 162 of the charging module 160 exposed by the accommodation groove 114, and through the contact between the charging rings 170 and the charging elastic sheets 162, the charging module 160 may provide power to the stylus 120, so that the stylus 120 may store power. In addition, because the charging elastic sheets 162 generate a pushing force on the stylus 120, the stylus 120 may be secured in the accommodation groove 114 through the magnetic attraction force of the second magnet 154 on the magnetic ring 140.

When it is necessary to use the stylus 120, the stylus 120 may be rotated as shown by the double-headed arrow in FIG. 2. Here, the rotation direction of the stylus 120 is not limited to be a counterclockwise direction or a clockwise direction. Thereby, the first magnet 130 and the second magnet 152 are magnetically repulsive; with such a repulsive force of the second magnet 152 and the first magnet 130, the front end 122 of the stylus 120 is popped out of the accommodation groove 114.

Figure 5A:
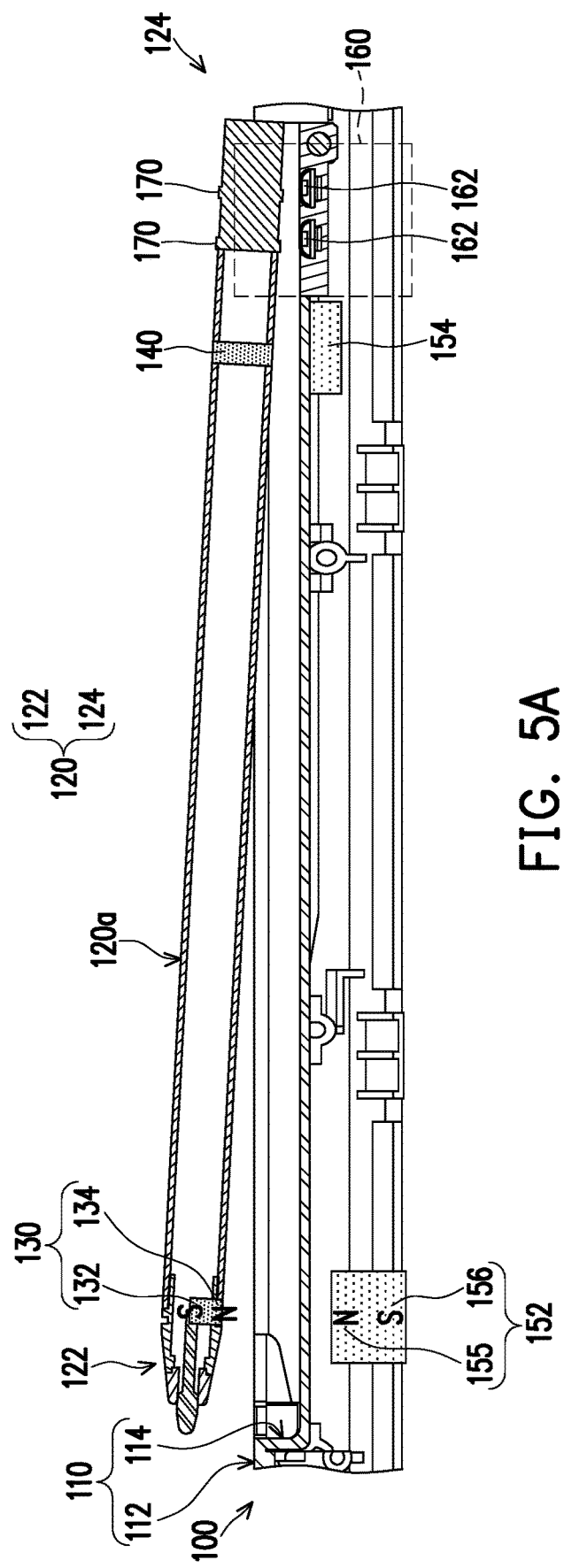
FIG. 5A and FIG. 5B are schematic views illustrating that a front end of a stylus is popped out of an accommodation groove according to an embodiment of the disclosure.
Figure 5B:
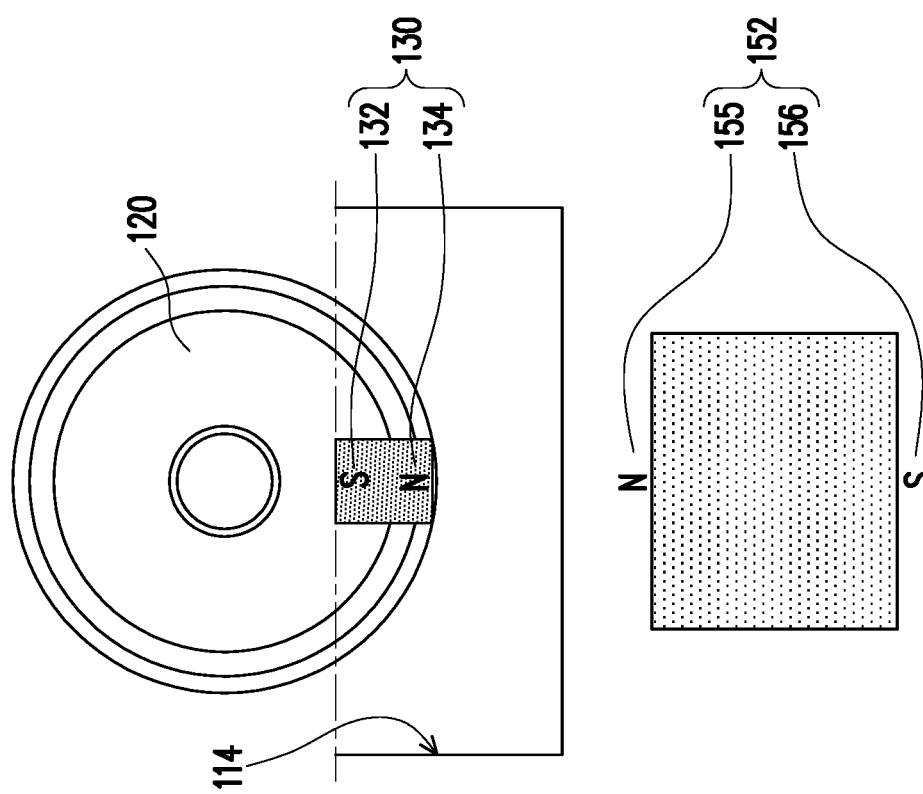

FIG. 4 is a schematic view of rotating a stylus placed in an accommodation groove according to an embodiment of the disclosure, and FIG. 5A and FIG. 5B are schematic views illustrating that a front end of a stylus is popped out of an accommodation groove according to an embodiment of the disclosure. With reference to FIG. 4, FIG. 5A, and FIG. 5B at the same time, specifically, the stylus 120 is rotated in a clockwise or counterclockwise manner in an axial direction A of the stylus 120 acting as the center of axis. When the magnetic field of the first magnetic pole 132 (N-pole) of the first magnet 130 and the magnetic field of the third magnetic pole 155 (N-pole) of the second magnet 152 interfere with each other, a magnetic repulsive force is generated, whereby the front end 122 of the stylus 120 is popped out of the accommodation groove 114. Therefore, the user may easily take the front end 122 of the stylus 120 popped out of the accommodation groove 114 by hand and then take out the entire stylus 120 from the accommodation groove 114.

It may be known from the above that the first magnetic pole 132 of the first magnet 130 and the third magnetic pole 155 of the second magnet 152 are magnetically repulsive, so that the front end 122 of the stylus 12 may be popped out of the accommodation groove 114. As such, the user may easily take the stylus 120 through picking up the front end 122 of the stylus 120 instead of digging up the stylus 120 from the accommodation groove 114 through the rear end 124 of the stylus 120. Therefore, the shape of the accommodation groove 114 in this embodiment conforms to the stylus 120, and there is no need to additionally arrange a finger accommodation groove at the rear end 124 of the accommodation groove 114 corresponding to the stylus 120. Compared to the conventional casing of the electronic device, the casing 110 of the electronic device 100 looks more aesthetic to users.

To sum up, in the electronic device provided in one or more embodiments of the disclosure, through the arrangement of the first magnet and the second magnets, the front end of the stylus may be popped up from the accommodation groove due to the magnetic repulsion of the first magnet and the second magnet, so that the user may easily pick up the stylus from the accommodation groove. Besides, it is not required to additionally arrange any finger accommodation groove at the rear end of the accommodation groove corresponding to the stylus; therefore, compared to the conventional casing of the electronic device, the casing of the electronic device provided in one or more embodiments of the disclosure looks more aesthetic to users.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a casing, having a surface and an accommodation groove recessed from the surface;
   a stylus, having a front end and a rear end;
   a first magnet, disposed at one of the front end and the rear end of the stylus;
   a magnetic ring, disposed at the other of the front end and the rear end of the stylus; and
   a pair of second magnets, disposed in the casing and located below the accommodation groove, wherein locations of the first magnet and the magnetic ring correspond to locations of the pair of second magnets.

2. The electronic device according to claim 1, wherein the first magnet has a first magnetic pole and a second magnetic pole along a radial direction of the stylus, the first magnetic pole is close to a circumferential surface of the stylus, and the second magnetic pole is close to a center of axis of the stylus.

3. The electronic device according to claim 2, wherein each of the pair of second magnets has a third magnetic pole and a fourth magnetic pole.

4. The electronic device according to claim 3, wherein the magnetic poles of the pair of second magnets are placed in the same manner or in different manners.

5. The electronic device according to claim 3, wherein the third magnetic poles of the pair of second magnets whose locations correspond to the first magnet are relatively close to the accommodation groove, the fourth magnetic poles of the pair of second magnets whose locations correspond to the first magnet are relatively far away from the accommodation groove, and the first magnetic pole and the third magnetic poles are magnetically repulsive.

6. The electronic device according to claim 1, wherein the pair of second magnets is spaced from each other.

7. The electronic device according to claim 1, further comprising a charging module disposed in the casing, the charging module having a pair of charging elastic sheets located in and exposed by the accommodation groove.

8. The electronic device according to claim 7, further comprising a pair of charging rings disposed at the stylus, and when the stylus is stored in the accommodation groove, the pair of charging rings contacts the pair of charging elastic sheets to charge the stylus.

* * * * *